United States Patent
Deissler et al.

(10) Patent No.: US 10,429,630 B2
(45) Date of Patent: Oct. 1, 2019

(54) MICROSCOPE FOR TRANSMITTED-LIGHT AND FLUORESCENCE MICROSCOPY

(71) Applicant: Leica Microsystems CMS GmbH, Wetzlar (DE)

(72) Inventors: Benjamin Deissler, Butzbach (DE); Christian Schumann, Lich (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 15/771,341

(22) PCT Filed: Oct. 28, 2016

(86) PCT No.: PCT/EP2016/076117
§ 371 (c)(1),
(2) Date: Apr. 26, 2018

(87) PCT Pub. No.: WO2017/076776
PCT Pub. Date: May 11, 2017

(65) Prior Publication Data
US 2018/0307031 A1  Oct. 25, 2018

(30) Foreign Application Priority Data

Nov. 5, 2015 (DE) .................. 10 2015 119 022
May 30, 2016 (DE) .................. 10 2016 109 945

(51) Int. Cl.
*G02B 21/16*  (2006.01)
*G02B 21/36*  (2006.01)
(Continued)

(52) U.S. Cl.
CPC ........... *G02B 21/365* (2013.01); *G02B 21/06* (2013.01); *G02B 21/16* (2013.01); *G02B 27/1006* (2013.01); *G06T 2207/10056* (2013.01)

(58) Field of Classification Search
CPC ....... G02B 21/06; G02B 21/16; G02B 21/365
(Continued)

(56) References Cited

U.S. PATENT DOCUMENTS 4,211,924 A * 7/1980 Muller .................. H01J 37/224
250/311
2001/0045506 A1  11/2001 Masuyama
(Continued)

FOREIGN PATENT DOCUMENTS

DE  202004010121 U1  8/2004
DE  102007007797 A1  8/2008
(Continued)

OTHER PUBLICATIONS

International Search Report from PCT/EP2016/076117, filed Oct. 28, 2016, dated Jan. 17, 2017.

*Primary Examiner* — Robert Chevalier
(74) *Attorney, Agent, or Firm* — Patentbar International, P.C.

(57) ABSTRACT

A fluorescence microscope has an incident fluorescence illumination unit generating an incident fluorescence illumination beam path a multi-band fluorescence filter system encompassing a multi-band beam splitter for deflecting the incident fluorescence illumination beam path into an objective of the microscope and onto a specimen. The filter system has a multi-band blocking filter that at least partly transmits a fluorescence emission beam path proceeding from the specimen; and having a digital camera for generating a fluorescence image of the specimen. The microscope has a bright-field transmitted illumination unit for generating a bright-field transmitted illumination beam path for transmitted illumination of the specimen. The filter system is arranged fixedly so that upon acquisition of a bright-field image of the specimen, the system remains in a bright-field transmitted light beam path proceeding from the specimen.

(Continued)

The digital camera has a white balance function that is executed before the bright-field image is generated.

11 Claims, 1 Drawing Sheet

(51) Int. Cl.
*G02B 21/06* (2006.01)
*G02B 27/10* (2006.01)

(58) Field of Classification Search
USPC .............................. 348/49, 46, 47, 48, 50, 54
See application file for complete search history.

(56) References Cited

U.S. PATENT DOCUMENTS

2008/0198448 A1\* 8/2008 Ganser .................... G02B 21/06
359/385
2014/0247379 A1\* 9/2014 Najmabadi ........ G01N 21/6458
348/295
2017/0038573 A1\* 2/2017 Uhl .................... G02B 21/0044

FOREIGN PATENT DOCUMENTS

EP          1593996 A2   11/2005
WO         98/52018 A1   11/1998

\* cited by examiner

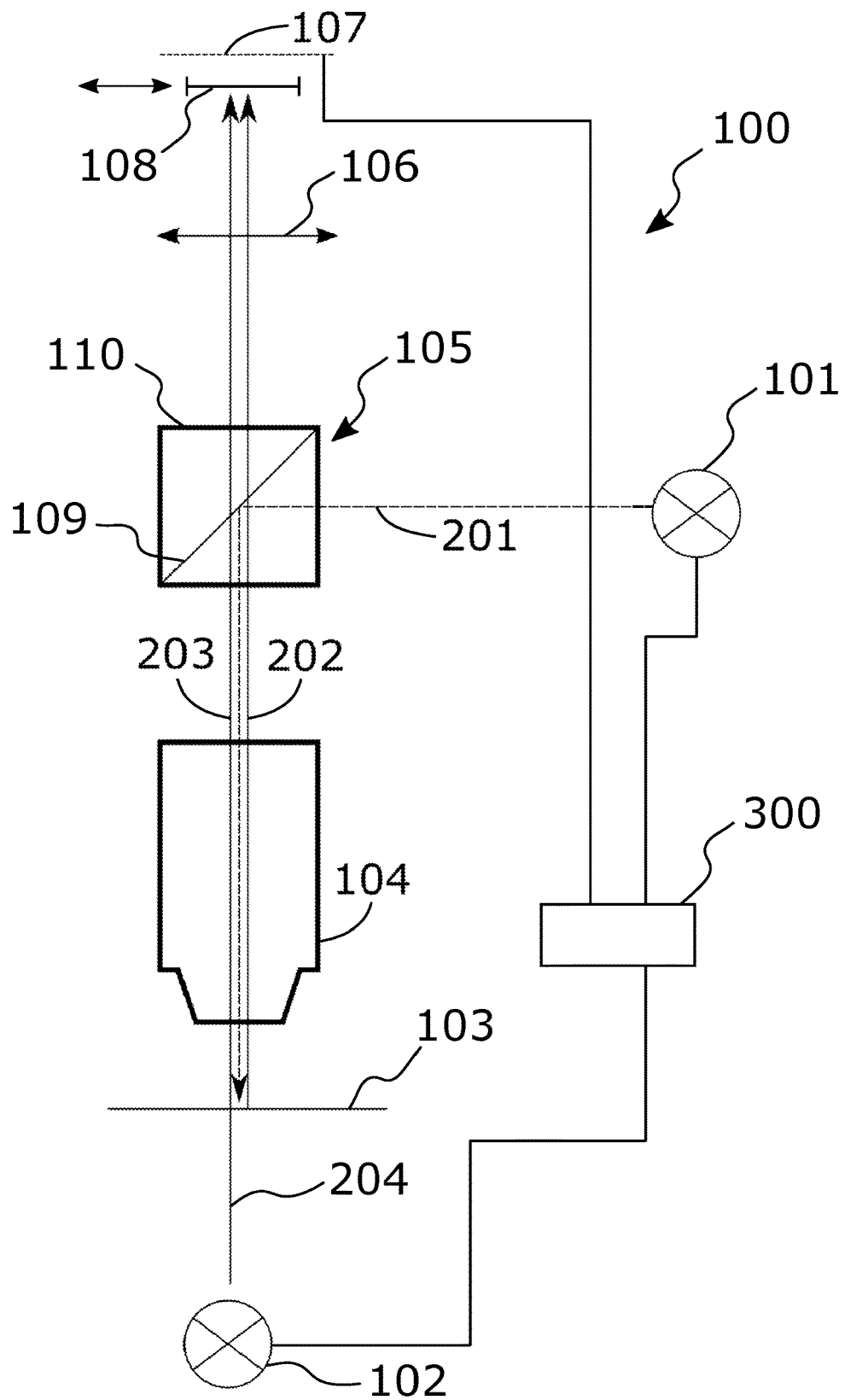

MICROSCOPE FOR TRANSMITTED-LIGHT AND FLUORESCENCE MICROSCOPY

RELATED APPLICATIONS

This Application is a U.S. National Stage Under 35 USC § 371 of International Application PCT/EP2016/076117, filed on Oct. 28, 2016, which in turn claims priority to German Patent Applications DE 10 2015 119 022.2, filed Nov. 5, 2015 and DE 10 2016 109 945.7, filed May 30, 2016, all of which are incorporated herein by reference in their entirety.

FIELD OF THE INVENTION

The present invention relates to a fluorescence microscope having an incident fluorescence illumination unit for generating an incident fluorescence illumination beam path; having a multi-band fluorescence filter system encompassing a multi-band beam splitter for deflecting the incident fluorescence illumination beam path, or the illumination light provided for fluorescence excitation, into an objective of the fluorescence microscope and onto a specimen to be investigated, the multi-band fluorescence filter system comprising a multi-band blocking filter that at least partly transmits a fluorescence emission beam path proceeding from the specimen or fluorescence light proceeding from the specimen; and having a digital camera for generating a fluorescence image of the specimen from the acquired fluorescence emission beam path. The invention further relates to a method for generating a bright-field image of a specimen using a fluorescence microscope.

BACKGROUND OF THE INVENTION

Fluorescence microscopy plays a major role as a diagnostic tool in many scientific disciplines. The fundamental principle of fluorescence microscopy is that a sample is irradiated with short-wavelength excitation radiation, and that the sample itself, or a fluorescing dye with which the sample is stained, emits longer-wavelength fluorescence light (primary or secondary fluorescence) upon excitation with the short-wavelength excitation wavelength. For fluorescence microscopy, secondary fluorescence is utilized as a rule in order to make specific specimen structures of stained prepared specimens visible. It is thereby possible, for example, to identify pathogens, localize genes, identify genetic changes in a DNA being investigated, or even visualize protein formations in cells.

A particular investigation method using specific fluorescing dyes (called "fluorochromes") is available depending on the application. Typical excitations, for example, involve UV light for the "DAPI" dye, blue light for the "FITC" dye, or green light for the "Texas Red" or "Rhodamine" dyes. Typical excitation frequencies are in the ultraviolet and visible spectral region.

Conventionally, short-arc lamps filled with Hg or Xe, or halogen lamps, have usually be used as light sources. The spectral region appropriate for exciting a fluorochrome can be selected out of the spectral region of the light source using a variety of (exchangeable) dielectric filters called "excitation filters." The aforesaid lamps are nowadays being displaced by light-emitting diodes (LEDs) as light sources for fluorescence microscopy.

DE 20 2004 010 121 U1, for example, discloses a light source for an incident-light fluorescence microscope which comprises a high-output LED that emits blue light in a spectral region from 460 to 480 nm.

EP 1 592 996 A2 discloses a system having two light-emitting diodes whose illumination beam paths are combined by a dichroic splitter and directed onto a fluorescence filter system.

Different fluorescence filter systems, also referred to as "filter blocks" or "filter cubes," are typically worked with so that different stains of a prepared specimen can be visualized. These fluorescence filter systems have hitherto been made up of a mutually coordinated combination of an excitation filter, a dichroic splitter, and a blocking filter. The dichroic splitter reflects toward the prepared specimen the excitation radiation that the excitation filter allows to pass. The dichroic splitter is, however, transparent to the fluorescence light emitted from the prepared specimen. The blocking filter holds back excitation light that is scattered from the prepared specimen and enters the objective. It possesses maximum transparency, however, for the specific fluorescence radiation given off by the specimen.

The various fluorescence filter systems are usually located on a changing device that is embodied, for example, as a slider or carousel. Operation is effected in manual and/or motorized fashion.

DE 10 2007 007 797 A1 relates to a fluorescence microscope having an incident fluorescence illumination device. The illumination device encompasses several light-emitting diodes having upstream collectors for generating a directed light flux, the relevant light fluxes being combined by means of dichroic splitters into one common illumination beam path that in turn strikes a multi-band excitation filter of a multi-band fluorescence filter system. The latter encompasses a multi-band beam splitter as well as a multi-band blocking filter. The multi-band excitation filter is transparent to the wavelength regions of the respective light-emitting diodes, while the multi-band blocking filter is as opaque as possible to those wavelength regions but transmits the corresponding emission bands of the fluorescence radiation emitted from the specimen. Control is applied to the light-emitting diodes via a common logical control device in order to allow rapid switchover between excitation wavelengths. In the fluorescence microscope described therein, no provision is made for bright-field transmitted-light observation of the specimens.

In addition to incident-light fluorescence microscopy, it is often desirable also to investigate or observe specimen structures using bright-field transmitted-light microscopy. Fluorescence filter changing apparatuses are used to switch over between fluorescence imaging and bright-field imaging; these apparatuses are of complex design and cost-intensive to manufacture, and furthermore are slow to switch over between fluorescence imaging and bright-field imaging.

SUMMARY OF THE INVENTION

The object of the present invention is to describe a physically compact arrangement, operable in simple fashion by the user, for fluorescence-microscopy investigation of specimens using a fluorescence microscope, by means of which arrangement it is possible to switch over in equally simple fashion between fluorescence imaging and bright-field imaging.

This object is achieved according to the present invention by a fluorescence microscope in accordance with Claim 1, and by a method for generating a bright-field image of a specimen utilizing a fluorescence microscope in accordance with Claim 8. Advantageous embodiments are evident from the respective dependent claims and from the description that follows.

The fluorescence microscope according to the present invention comprises a bright-field transmitted illumination unit for generating a bright-field transmitted illumination beam path for transmitted illumination of the specimen. Care must correspondingly be taken that the microscope stage supporting the specimen permits transmitted illumination of the specimen. The multi-band fluorescence filter system of the fluorescence microscope is arranged fixedly and optically effectively in the beam path, and remains in a bright-field transmitted light beam path proceeding from the specimen even upon acquisition of a bright-field image of the specimen. The digital camera possesses, for generation of a bright-field image from the bright-field transmitted light beam path that is transmitted through the multi-band blocking filter of the multi-band fluorescence filter system and acquired by the digital camera of the fluorescence microscope, a white balance function that is executed before the bright-field image is generated.

This fluorescence microscope configured in accordance with the present invention makes it possible to switch back and forth between bright-field images and fluorescence images of a specimen, all that is necessary for the purpose being that control must be correspondingly applied to the incident fluorescence illumination unit and to the bright-field transmitted illumination unit. The multi-band fluorescence filter system of the fluorescence microscope remains in stationary fashion in the respective beam paths upon such a switchover, and can therefore be installed in fixed fashion. According to the present invention a complex fluorescence filter changing apparatus, which furthermore permits only delayed switchovers, can be omitted.

The bright-field transmitted light beam path proceeding from the specimen travels via the objective of the fluorescence microscope into the multi-band fluorescence filter system, where the multi-band beam splitter and the multi-band blocking filter transmit specific wavelength regions. These wavelength regions correspond to the emission bands that are acquired by the digital camera for generation of a fluorescence image of the specimen. A white LED is preferably used as a light source of the bright-field transmitted illumination unit. A shutter can be provided directly in front of the light source or white LED. Because a white LED has small dimensions, the shutter can also be small and thus can be moved quickly. The purpose of this shutter is to suppress fluorescence light of the conversion layer in the white LED in the fluorescence image. The broad-band emission spectrum of this light source encompasses the aforesaid emission bands that are transmitted by the multi-band blocking filter. Without further actions, discrepancies in color reproduction would therefore occur upon generation of a bright-field image of the specimen. Those discrepancies can be compensated for in the context of white balancing of the digital camera. A sample region having no absorption should preferably be available for white balancing. This can be achieved either by removing the specimen from the beam path or by finding a transparent region on the specimen slide. Thanks to the fixed installation of the multi-band filter system and the constant color temperature of white LEDs, the white balance data can of course also be saved or supplied as a manufacturer calibration. White balancing can thus, in principle, be carried out once, and the white balance data can be saved. All that is then necessary is to apply the saved data to the acquired image. It is therefore not obligatory necessary to carry out another white balance operation after each switchover to the bright-field transmitted light beam path.

It is the case in principle that the more emission bands transmitted by the multi-band blocking filter that are available for generating the bright-field image, the better the quality of the bright-field image. It is particularly advantageous if at least three emission bands are transmitted by the multi-band blocking filter (and thus also by the multi-band beam splitter) of the multi-band fluorescence filter system.

It is advantageous in terms of the generation of fluorescence images to select the multi-band fluorescence filter in suitable fashion so that a wide selection of fluorescing dyes can be used. The use of electronically switchable wavelength-limited solid state light sources allows rapid switchover between different excitation bands and correspondingly between different emission bands. Several excitation bands can also be utilized simultaneously. Solid state light sources having sharply defined wavelength regions also allow mechanical switching of excitation filters to be omitted. Appropriate solid state light sources are, principally, light-emitting diodes (LEDs) or semiconductor lasers.

Because the fluorescence microscope according to the present invention can, as explained above, dispense with mechanical changeover between imaging of the individual fluorescence channels, the switchover time is limited only by electronic processes in the context of control application to the incident fluorescence illumination unit. Any crosstalk between the fluorescence channels that correspond to the respectively transmitted emission bands can be limited by additional use of an emission filter. An emission filter of this kind cuts off a transmitted band in defined fashion on either side of the emission maximum, and thus prevents crosstalk between the fluorescence channels. It is advantageous in this case to embody the emission filter as part of a mechanically moved emission filter wheel. It is additionally advantageous if the emission filter is arranged in the vicinity of an intermediate image of the specimen and/or directly in front of the digital camera. Digital cameras often possess an adapter for switching in filters, and the aforesaid emission filter can be used here as well. In general, an emission filter of this kind should be arranged at a location of a small beam diameter.

Alternatively, crosstalk between the fluorescence channels can also be avoided using linear unmixing algorithms based on the acquired digital images. This linear unmixing method is commonly known in the existing art.

Reference is expressly made to the Applicant's DE 10 2007 007 797 A1, already mentioned, regarding capabilities for electronic switching of solid state light sources in the incident fluorescence illumination unit of a fluorescence microscope according to the present invention.

For switching over between bright-field imaging and fluorescence imaging, it is useful to utilize a control unit that is electronically connected on the one hand to the incident fluorescence illumination unit and on the other hand to the bright-field transmitted illumination unit, in such a way that either incident fluorescence illumination or bright-field transmitted illumination by the respective illumination units is activated by way of corresponding control signals. In addition, the control unit is electronically connected to the digital camera in such a way that upon a switchover to or activation of bright-field transmitted illumination, the white balance function of the digital camera is activated so as to perform a white balance before the bright-field image of the specimen is generated.

According to the present invention it is thus possible to dispense entirely with mechanical changing apparatuses in the context of switching over between the aforesaid illumination types. This economizes on cost and components, and minimizes the time required for switching over between the illumination types.

The invention further relates to a method for generating a bright-field image of a specimen using a fluorescence microscope, a fluorescence microscope according to the present invention, as has been discussed above, being used here in particular. The fluorescence microscope that is used comprises a bright-field illumination unit for generating a bright-field transmitted illumination beam path for transmitted illumination of the specimen. To generate a bright-field image, a multi-band fluorescence filter system of the fluorescence microscope remains in a bright-field transmitted light beam path proceeding from the specimen so that said path passes first through the objective of the fluorescence microscope and then through the multi-band fluorescence filter system. A digital camera of the fluorescence microscope firstly carries out a white balance operation before a bright-field image of the specimen is generated by that camera. For that purpose, the bright-field transmitted light beam path transmitted by the multi-band fluorescence filter system is acquired by the digital camera of the fluorescence microscope and processed, a tube lens of the fluorescence microscope providing corresponding focusing, in the usual manner, onto the imaging array of the camera.

With regard to details and advantages of the method according to the present invention and with regard to further embodiments of that method, reference may be made to the explanations regarding the fluorescence microscope according to the present invention, which can be transferred analogously to the method according to the present invention.

Further advantages and embodiments of the invention are evident from the description and from the appended drawings.

It is understood that the features recited above and those yet to be explained below are usable not only in the respective combination indicated, but also in other combinations or in isolation, without departing from the scope of the present invention.

BRIEF DESCRIPTION OF THE DRAWINGS

The invention is schematically depicted in the drawings on the basis of an exemplifying embodiment, and will be described below with reference to the drawings.

FIG. 1 shows a fluorescence microscope according to the present invention that is labeled in its entirety as 100.

DETAILED DESCRIPTION OF THE PREFERRED EMBODIMENTS

This fluorescence microscope 100 comprises in usual fashion an incident fluorescence illumination unit 101 for generating an incident fluorescence illumination beam path 201. This illumination unit 101 is depicted merely schematically here. Illumination unit 101 in fact contains one or several solid state light sources such as LEDs; with several light sources, by means of a control application system known per se it is possible to switch back and forth between those light sources, or to operate several light sources simultaneously. Reference may once again be made explicitly to DE 10 2007 007 797 A1 already recited. In accordance with the solid state light source that is activated, excitation light in the form of incident fluorescence illumination beam path 201 travels into a multi-band fluorescence filter system 105. A multi-band excitation filter can firstly be provided here, but can be omitted when solid state light sources having a sufficiently sharply delimited emission spectrum are used. Incident fluorescence illumination beam path 201 then travels onto a multi-band beam splitter 109 in order to deflect illumination beam path 201 into an objective 104 of fluorescence microscope 100. Illumination beam path 201 is focused by objective 104 into the plane of specimen 103.

Fluorescence emission radiation generated by specimen 103 travels in the form of fluorescence emission beam path 202 through objective 104 back into multi-band fluorescence filter system 105. There it passes through multi-band beam splitter 109 and multi-band blocking filter 110. The emission band thereby transmitted is then available for generating a fluorescence image of specimen 103. For this, fluorescence emission beam path 202 is focused via tube lens 106 of fluorescence microscope 100 and (optional) camera lenses (not further depicted here) onto the light-sensitive imaging array of digital camera 107 of fluorescence microscope 100. Acquisition and processing of the arriving light result, in a manner known per se, in generation of a fluorescence image of specimen 103.

In the exemplifying embodiment depicted in FIG. 1, fluorescence microscope 100 furthermore possesses a bright-field transmitted illumination unit 102 for transmitted illumination of specimen 103. For that purpose, the microscope stage carrying specimen 103 is correspondingly designed for transmitted illumination. Bright-field transmitted illumination beam path 204 generated by this illumination unit 102 transilluminates specimen 103. Bright-field transmitted illumination unit 102 is once again depicted only very schematically. A white LED can be used here, for example, as a light source. Bright-field transmitted light beam path 203 proceeding from specimen 103 passes through objective 104 and through the fixedly installed multi-band fluorescence filter system of fluorescence microscope 100. The emission bands that are transmitted by multi-band fluorescence filter system 105 are consequently available for generating the bright-field image, provided those emission bands are also originally radiated by the bright-field transmitted illumination unit. Via tube lens 106 and any camera lenses, digital camera 107 can acquire and process the bright-field transmitted light beam path for generation of the bright-field image of specimen 103. Because of the limitation to the aforesaid emission bands, a white balance of digital camera 107 is performed before the bright-field image is generated, in order to compensate for discrepancies in color reproduction.

It is thereby possible to generate not only fluorescence images but also bright-field images using a fluorescence microscope. This is desirable in many cases. In particular, the switchover between fluorescence imaging and bright-field imaging can be performed in entirely electronic fashion, with no mechanical changing apparatuses. It is useful for that purpose to provide a control unit 300 that is operatively connected to incident fluorescence illumination unit 101 and to bright-field transmitted illumination unit 102, i.e. that electronically applies control to the respective illumination unit in order to activate the respective illumination type. Upon activation of bright-field transmitted illumination unit 102, control is concurrently applied by control unit 300 to digital camera 107, such that by means of corresponding electronic signals, the white balance function of camera 107 is firstly activated before camera 107 then generates bright-field images of specimen 103.

An emission filter 108, which here can be in particular an emission filter wheel having several emission filters, can optionally be provided in fluorescence emission beam path 202. This emission filter wheel serves for clean separation of the fluorescence channels, by the fact that an emission filter cuts off a transmitted emission band in defined fashion on both sides. An emission filter 108 or emission filter wheel of this kind would need to be removed from the beam path before generation of a bright-field image of specimen 103. It can therefore also be useful if possible crosstalk between the fluorescence channels is prevented in an electronic or software-based manner. Linear unmixing algorithms for the acquired digital images are available for this purpose.

PARTS LIST

100 Fluorescence microscope
101 Incident fluorescence illumination unit
102 Bright-field transmitted illumination unit
103 Specimen
104 Objective
105 Multi-band fluorescence filter system
106 Tube lens
107 Camera
108 Emission filter
109 Multi-band beam splitter
110 Multi-band blocking filter
201 Incident fluorescence illumination beam path
202 Fluorescence emission beam path
203 Bright-field transmitted light beam path
204 Bright-field transmitted illumination beam path
300 Control unit

What is claimed is:

1. A fluorescence microscope comprising:
    an incident fluorescence illumination unit for generating an incident fluorescence illumination beam path;
    a multi-band fluorescence filter system encompassing a multi-band beam splitter for deflecting the incident fluorescence illumination beam path into an objective of the fluorescence microscope and onto a specimen to be investigated, the multi-band fluorescence filter system comprising:
        a multi-band blocking filter that at least partly transmits a fluorescence emission beam path proceeding from the specimen; and
        a digital camera for generating a fluorescence image of the specimen from the acquired fluorescence emission beam path;
    a bright-field transmitted illumination unit for generating a bright-field transmitted illumination beam path for transmitted illumination of the specimen;
    the multi-band fluorescence filter system being arranged fixedly so that during acquisition of a bright-field image of the specimen, said system remains in a bright-field transmitted light beam path proceeding from the specimen; and
    the digital camera having a white balance function for generation of a bright-field image from the acquired bright-field transmitted light beam path that is transmitted through the multi-band blocking filter of the multi-band fluorescence filter system, the white balance function being executed before the bright-field image is generated.

2. The fluorescence microscope according to claim 1, wherein the multi-band blocking filter of the multi-band fluorescence filter system transmits at least three emission bands.

3. The fluorescence microscope according to claim 1, further comprising an emission filter which additionally filters the radiation transmitted by the multi-band blocking filter.

4. The fluorescence microscope according to claim 3, wherein the emission filter is embodied as part of an emission filter wheel.

5. The fluorescence microscope according to claim 3, wherein the emission filter is arranged in the vicinity of an intermediate image of the specimen and/or directly in front of the digital camera.

6. The fluorescence microscope according to claim 1, wherein the incident fluorescence illumination unit comprises at least one solid state light source.

7. The fluorescence microscope according to claim 6, wherein the multi-band fluorescence filter system has no excitation filter.

8. The fluorescence microscope according to claim 1, wherein the fluorescence microscope comprises a control unit, the control unit being electronically connected to the incident fluorescence illumination unit and to the bright-field transmitted illumination unit in such a way that a switchover between incident fluorescence illumination and bright-field transmitted illumination is performed as a function of corresponding control signals, the control unit being electronically connected to the digital camera in such a way that upon a switchover to bright-field transmitted illumination, the white balance function in the digital camera is activated by means of corresponding control signals.

9. A method of using a fluorescent microscope for generating a bright-field image of a specimen, the method comprising:
    generating a bright-field transmitted illumination beam path for transmitted illumination of the specimen via a fluorescence microscope that comprises a bright-field transmitted illumination unit;
    generating of a bright-field image by using a multi-band fluorescence filter system of the fluorescence microscope remaining in a bright-field transmitted light beam path proceeding from the specimen; and
    carrying out a while balance operation by a digital camera of the fluorescence microscope before it generates a bright-field image of the specimen.

10. The method according to claim 9, further comprising providing an incident fluorescence illumination unit for generating an incident fluorescence illumination beam path; deflecting the incident fluorescence illumination beam path by a multi-band beam splitter of the multi-band fluorescence filter system into an objective of the fluorescence microscope and onto the specimen; at least partially transmitting a florescence emission beam path proceeding from the specimen via a multi-band blocking filter of the multi-band fluorescence filter system; and acquiring the fluorescent emission beam path by the digital camera for generating the fluorescence image.

11. The method according to claim 10, further comprising switching over between generating of a bright-field image of the specimen and generating of a fluorescence image of the specimen by applying electronic control to a switchover between the bright-field transmitted illumination unit and the incident fluorescence illumination unit such that upon a switchover to the bright-field transmitted illumination unit electronic control is applied to the digital camera for carrying out a white balance operation before generating the bright-field image.

* * * * *